Patented Nov. 22, 1932

1,888,286

UNITED STATES PATENT OFFICE

JOHN HAMILTON PATERSON, OF WESTMINSTER, LONDON, ENGLAND, ASSIGNOR TO IMPERIAL CHEMICAL INDUSTRIES LIMITED, OF WESTMINSTER, ENGLAND, A BRITISH COMPANY

ELECTRODE FOR USE IN ARC WELDING

No Drawing. Application filed February 7, 1930, Serial No. 426,768, and in Great Britain February 18, 1929.

This invention relates to electrodes of the stranded wire type for use in arc welding.

According to this invention the wires constituting the electrode are plaited together individually or in groups, so that each wire or group of wires comes to the surface of the electrode at equal intervals along its length, the distance between the intervals being preferably not greater than the length of the holder or nozzle which, in use, is employed to convey current to the electrode. That is, the elements of the electrode are laid alternately over and under each other longitudinally of the electrode, keeping each one as nearly parallel to the longitudinal axis as is consistent with the weaving or plaiting action, so that each element, when displaced at all from the longitudinal, is displaced more radially of the electrode than circumferentially thereof. Ordinary plaiting is not sufficient for the purposes of the invention, however, and the elements must be so plaited that each element goes under another or comes to the surface over another forming nodes equidistantly spaced along the length of the electrode. Furthermore, this node distance is made to depend on the particular holder with which it is to be used, being made no greater than the length of said holder. By this means each wire or group of wires simultaneously makes electrical contact with the current-conveying member of the welding tool or holder, and, whether the electrode is stationary or in motion therein, each wire carries its proper share of the welding current. Thus, for example in the case of the welding tool forming the subject matter of English Patent No. 301,125, adequate electrical contact is made simultaneously between each wire or group of wires and the nozzle through which the electrode is fed; in this manner local preheating of the electrode is prevented.

Especially in cases in which the electrode is made by plaiting groups of wires together, it may happen that, owing to the shortness of the current-conveying device, the individual wires might not simultaneously make contact with such device. This difficulty can be overcome by joining together the wires forming either the electrode as a whole or each group by welding them at intervals as in the electrode described in English patent specification No. 302064. Alternatively, or in addition, the wires forming each group may be given a slight twist before plaiting them together so that individual wires will in turn come uppermost and thus make the necessary contact with the current-conveying member of the apparatus.

As a means of further improving the electrical contact between the individual wires or groups of wires or between the electrode as a whole and the nozzle or the like through which, in operation, it is passed, the individual wires or groups of wires or the electrode may be coated with a metal of high conductivity, such, for example, as copper, such coating being applied in any suitable manner, for instance, by a metal-spraying operation, by dipping in molten metal, by Sherardizing or by electro-plating.

A suitable flux may be incorporated in the electrode in any desired manner so long as it does not interfere with the electrical contact between the strands of the electrode and the current-carrying device. This flux may be incorporated by including strands of asbestos or similar yarn which may be impregnated with silicate of soda or other appropriate substance, or the required effect may be obtained by squeezing a suitable paste between the strands of the finished electrode and afterwards cleaning the outer surface of the electrode so as to expose the metal strands.

What I claim and desire to secure by Letters Patent of the United States is:—

1. A welding electrode comprising a plurality of elements, each element being laid alternately over and under the others throughout the length of the electrode, each element in laying being offset transversely of its length through the center of the electrode and thereby being displaced more radially of the electrode in each convolution than it is twisted circumferentially of the electrode, and each element throughout its length having the minimum displacement from a straight line as is consistent with said laying.

2. A welding electrode according to claim 1, in which each element comes to the surface of the electrode from the interior of the electrode through the center thereof, goes over an adjacent element near the surface, back through the center of the electrode and back to the surface again, at equidistant intervals, to thereby form equidistant contact nodes on the surface of the electrode whereby each element goes through the center of the electrode at least twice and comes to the surface at least three times in each revolution of the element.

3. An electrode according to claim 1, in which the outermost portion of each transversely up and down radial displacement of each element through the center of the electrode, constitutes a contact node on the surface of the electrode.

4. A welding electrode according to claim 1, in which each element consists of a plurality of wires, the wires in each element being twisted around each other with a low pitch and thereby making individual wires constitute intermediate contact nodes between the major contact nodes.

5. A welding electrode for use with welding tools including a holder, comprising a plurality of elements, each element being laid alternately over and under the others throughout the length of the electrode, each element in laying being offset up and down through the center of the electrode more than it is twisted circumferentially around the periphery of the electrode, the outermost portion of each offset constituting a contact node, the distance longitudinally of the electrode and around the periphery of the electrode from one node to another, being not greater than the length of the holder.

JOHN HAMILTON PATERSON.